No. 763,049. PATENTED JUNE 21, 1904.
C. F. DEGNER.
NUT LOCK.
APPLICATION FILED SEPT. 10, 1903.
NO MODEL.

Witnesses:
Chas. E. Gaylord.
John Enders.

Inventor:
Charles F. Degner,
By Dynfirth, Dynfirth & Lee
Att'ys

No. 768,049. Patented June 21, 1904.

UNITED STATES PATENT OFFICE.

CHARLES F. DEGNER, OF LAFAYETTE, INDIANA, ASSIGNOR TO AMERICAN LOCK WASHER COMPANY, OF NEW JERSEY.

NUT-LOCK.

SPECIFICATION forming part of Letters Patent No. 763,049, dated June 21, 1904.

Application filed September 10, 1903. Serial No. 172,586. (No model.)

*To all whom it may concern:*

Be it known that I, CHARLES F. DEGNER, a citizen of the United States, residing at Lafayette, in the county of Tippecanoe and State of Indiana, have invented a new and useful Improvement in Nut-Locks, of which the following is a specification.

Figure 1:
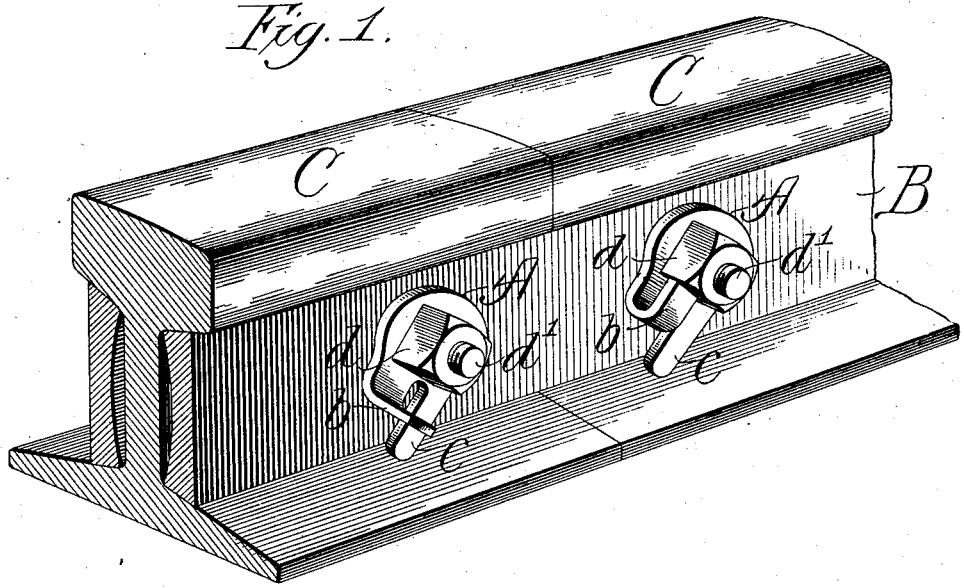
Figure 2:
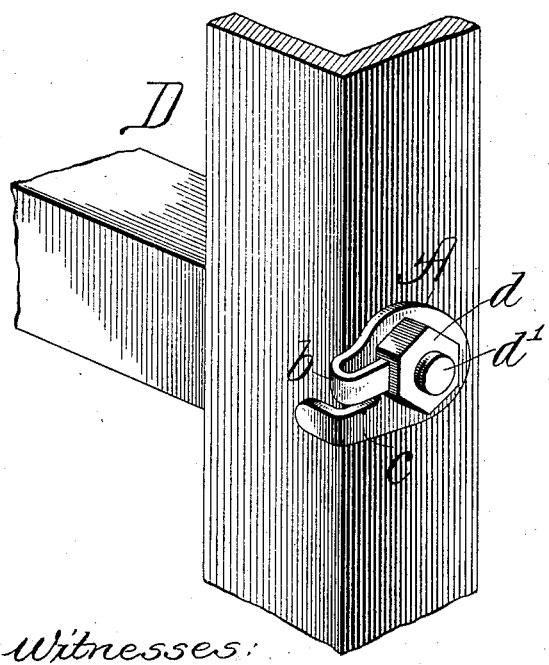
Figure 3:
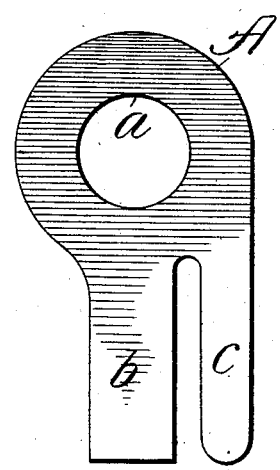

My invention relates to an improvement in the class of nut-locks in which a washer employed to encircle the bolt behind the nut is provided with a stop presented to one of the side faces of the angular nut to obstruct it against rotation independent of the bolt. All such nut-locks known to me are constructed with projections or teeth of one form or another extending inwardly into the annular opening in the washer from the edge thereof to enter recesses in the bolts for locking the nuts against turning thereon. The provision of these projections on the washers necessitates mutilation of the bolts by forming therein the recesses to receive them, which is found to be a serious objection in the nut-locks referred to, since to use them requires the use of bolts of particular construction, whereas the desire of the consumer is to be provided with a nut-lock that may be employed to cooperate with any bolt for locking the nut thereon.
The primary object of my improvement is to provide a nut-lock of the aforesaid washer variety for use on railway-tracks and on machinery that shall be devoid of the objection referred to, and to this end I form the metal washer with a uniform or unserrated inner annular edge and provide on the washer one or more legs extending to engage with a stable part of the track or machine on which the nut-lock is applied.
Referring to the accompanying drawings, Figure 1 is a perspective view representing my improved nut-lock applied to the fish-plate at a rail-joint, one of the illustrated applications showing the nut-lock in its original form and the other showing it with its nut-stop feature in operative position. Fig. 2 is a similar view showing the nut-lock applied to a machine-frame, of which only a broken portion is represented; and Fig. 3, an enlarged plan view of the nut-lock blank of the original form in which it is stamped out of metal.

My improved nut-lock comprises as its essential construction a metal washer A, having a uniform or unserrated inner annular edge $a$, an arm $b$ extending from the outer edge of the washer, and a leg $c$, or more than one such leg, also extending therefrom. The nut-lock may be formed by stamping it out of suitably-flexible metal in the shape represented in Fig. 3, when it is completed by bending the arm $b$ about midway between its ends to a right angle, as shown, of one of the nut-locks in Fig. 1, or to any other suitable angle. The normally bent condition of the arm $b$, in addition to facilitating the act of further bending it to cause its extremity to engage the side of the nut, provides the washer with a convenient handle by which the washers are easily manipulated both in placing them upon the bolt and in holding them while the nut is being turned to its tightened position.

To apply my improved nut-lock so as to cooperate with a nut $d$ on a bolt $d'$ in a rail-joint formed with a fish-plate B, as represented in Fig. 1, the nut-lock is applied in its form presented at the left in that figure to encircle the bolt and bear at the extremity of its leg $c$ against the base or flange of the rail C. The nut $d$ is then screwed on the bolt, when the outwardly-projecting portion of the angular arm $b$ is bent, as by hammering it, into the condition in which it is represented at the right in Fig. 1 to register its extremity with and bear it against a side of the nut. With the nut-lock thus applied it effectively locks the nut against backward turning either on or with the bolt, since the engagement of the leg $c$ with the rail-flange presents a stop to the washer A against such turning, and the abutment of the arm $b$ against the nut exerts the same effect on the latter.

The application of the nut-lock to a machine-frame D, as represented in Fig. 2, or to any part of a machine, is similar to its application already described with relation to a rail-joint, except that it may be necessary to bend the end of the leg $c$, as represented in that figure, over a part of the frame or of the machine to engage it with the stable object for preventing rotation of the washer.

While I have shown and described my improved nut-lock only as applied to a nut, it may with equal advantage be similarly applied also to the head of a bolt to lock it against backward turning, and I intend that such use shall be included within my invention.

What I claim as new, and desire to secure by Letters Patent, is—

A nut or bolt lock formed of one piece of metal and comprising a washer having a bolt-opening, an arm extending radially from the washer and normally having an upturned portion adapted to be bent over to present its extremity to the side of the nut or bolt head when locked, and a leg extending tangentially from the washer in the plane of the latter and parallel with said arm, said leg being flexible permitting of its being bent into engagement with a stationary object.

CHARLES F. DEGNER.

In presence of—
M. S. MACKENZIE,
WALTER N. WINBERG.